Sept. 16, 1969  C. FEUTREL ET AL  3,466,975
APPARATUS FOR SEMI-AUTOMATICALLY MACHINING HELICAL
FINS IN TUBULAR MEMBERS
Filed June 14, 1966  2 Sheets-Sheet 1
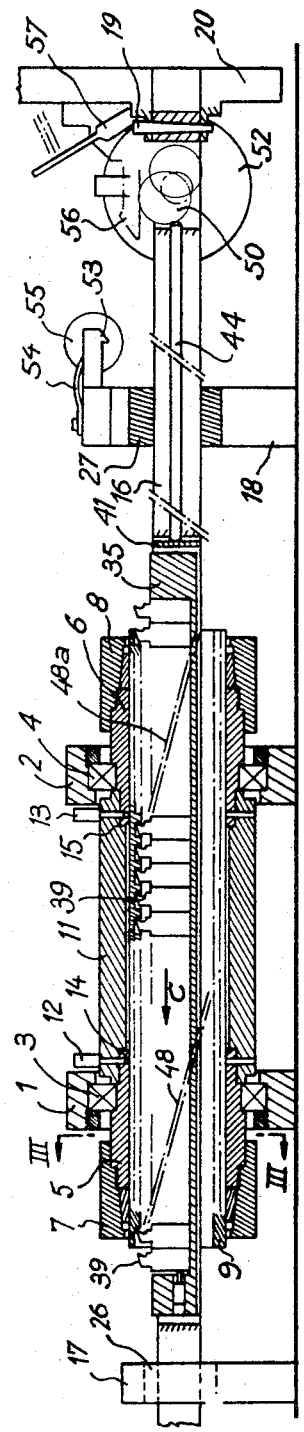
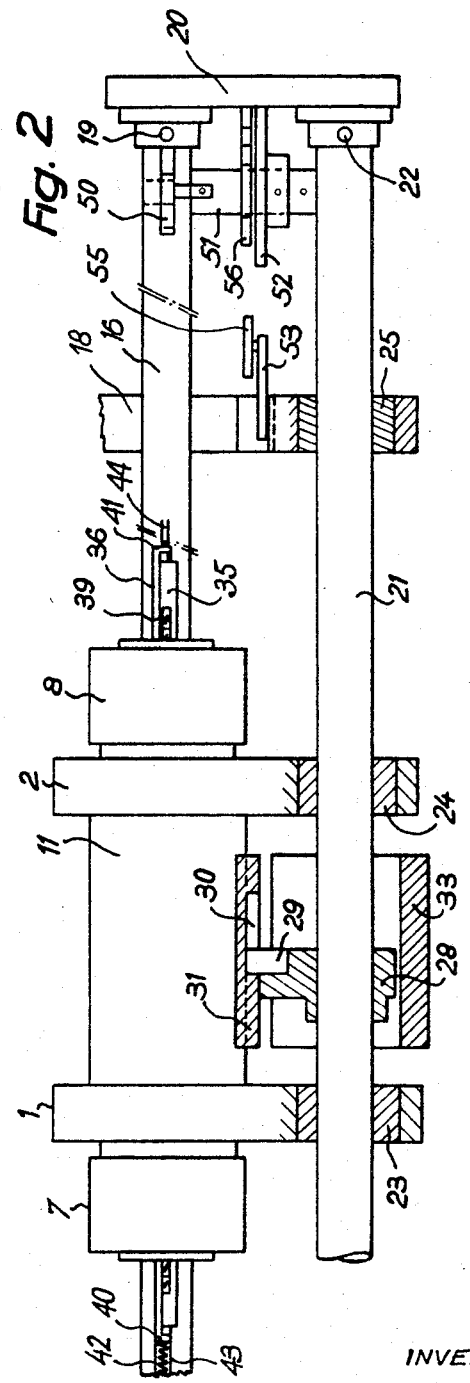
INVENTORS
CLAUDE FEUTREL
MICHEL LOUBET
GÉRARD LUCE
BY
Bacon & Thomas
ATTORNEYS Sept. 16, 1969    C. FEUTREL ET AL    3,466,975
APPARATUS FOR SEMI-AUTOMATICALLY MACHINING HELICAL
FINS IN TUBULAR MEMBERS
Filed June 14, 1966    2 Sheets-Sheet 2

INVENTORS
CLAUDE FEUTREL
MICHEL LOUBET
GÉRARD LUCE
BY
Bacon & Thomas
ATTORNEYS

United States Patent Office 3,466,975
Patented Sept. 16, 1969

3,466,975
APPARATUS FOR SEMI-AUTOMATICALLY MACHINING HELICAL FINS IN TUBULAR MEMBERS
Claude Feutrel, Antony, Hauts-de-Seine, Michel Loubet, Montgeron, Essone, and Gerard Luce, Crosne, Essone, France, assignors to Commissariat a l'Energie Atomique, Paris, France
Filed June 14, 1966, Ser. No. 557,588
Claims priority, application France, June 30, 1965, 22,925
Int. Cl. B23d 5/02, 41/08
U.S. Cl. 90—28.1                                   5 Claims

ABSTRACT OF THE DISCLOSURE

An apparatus for machining grooves defining internal helical fins in tubular members comprising two clamping mandrels mounted to rotate in bearings integral with a frame of the apparatus in which are fixed the ends of the tubular member to be machined. The mandrels are connected together by a jacket whose ends are secured to the mandrels. The jacket surrounds the member to be machined and is rotated by a spiral slot and key connection which it has with an external reciprocating shaft parallel to and rigid with a tool-supporting spindle arranged inside the tubular member. A cutting tool carrier mounted in a slot in the spindle is moved in increments radially outwardly at the end of each operating cycle by an inclined key on an axially movable blade, engaged in a cooperating inclined groove in the tool carrier. The blade is moved an increment each time the spindle comes to the end of a reciprocating cycle by a rod acted upon by a cam driven step-by-step by a ratchet driven gear.

---

The present invention relates to a method of and apparatus for semi-automatically machining helical fins in tubular members.

In heat-exchanger apparatus, tubular metal members can be used which are provided with internal fins for increasing their heat-exchanging surface.

In particular, in nuclear reactors provided with annular-section fuel members, the latter comprise an external sheath and an internal sheath, both constituted by tubular members of cylindrical or prismatic form, provided with helical fins.

Concerning the internal tubular members, the machining of helical fins which are situated inside the member presents problems which cannot be satisfactorily solved by machine tools known up to the present.

It is an object of the invention to provide a method of and apparatus for machining tubular members by making, under good conditions, helical grooves in the internal wall of the member, so as to produce fins defined by two adjacent grooves.

Thus the invention consists in a method for this purpose wherein a rotational movement is communicated to the member to be machined, whilst the cutting tools or combs, which do not form part of the present invention, are displaced axially to the member, in an alternate movement, machining being effected during one of the two travels.

Thus, a helical movement may be effected with a pitch of left or right hand by reversing the direction of rotation of the member to be machined.

On the other hand, it is also possible to produce threads or fins whose pitch may be left handed or right handed alternately, on sectors which have been previously machined in the tubular member.

The invention also consists in apparatus for this purpose that comprises a tool-carrying spindle and a shaft for rotating the member, said tool and shaft having imparted thereto an alternate rectilinear movement such as that which can be supplied in particular by a shaper or a jack.

In accordance with the invention, a tubular member to be machined is placed in two mandrels, mounted to rotate on the frame of the machine, a spindle provided with cutting tools being arranged inside the tubular element, these tools being constituted by blades arranged along parallel planes and inclined with respect to an internal generating line of the tubular member which they are cutting; the cutting tools are alternately moved parallel to the axis of the tubular member which is simultaneously rotated, whilst a radial displacement, corresponding to the depth of the machining of the groove, is communicated to the cutting tools.

According to another feature of the invention, two clamping mandrels mounted to rotate in bearings secured to the frame of the machine and in which are fixed the ends of the tubular member to be machined, are connected together by a jacket whose ends are secured to said mandrels, the jacket surrounding the member to be machined comprising rotation means which co-operate with a shaft parallel to a tool-supporting spindle arranged inside the tubular member said spindle and shaft being secured at one of their ends to a thrust plate to which an alternating movement is imparted and being guided in bearings fixed to the frame.

In order that the invention may be more clearly understood, reference will now be made to the accompanying drawings which show one embodiment thereof by way of example, and in which:

FIGURE 1 shows an elevational and sectional view of an apparatus according to the invention, FIGURE 2 shows a plan view in partial section through the apparatus of FIGURE 1.

Figure 4:
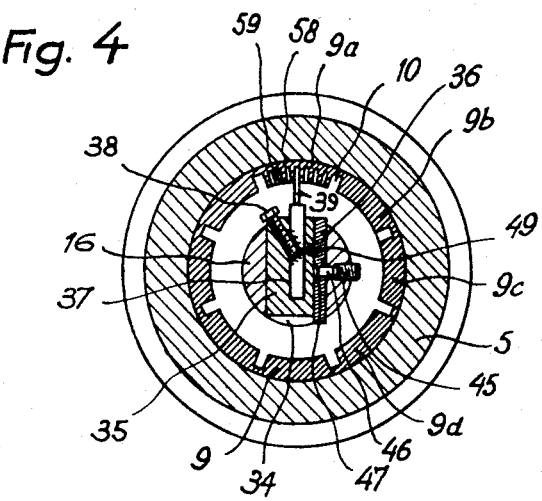
FIGURE 4 shows a sectional view along the line III—III of FIGURE 1.

Referring now to the drawings, the apparatus for machining helical fins in a tubular member shown in FIGURES 1 and 2 is constituted by two supports 1, 2 secured to or forming part of a frame fitted with ball bearings 3, 4, respectively, in which are mounted mandrels 5, 6 of any desired kind, having clamping rings 7, 8. In these mandrels 5, 6 are respectively held clamped the ends of a tubular member 9 to be machined, whose internal wall is divided into a plurality of portions 9a, 9b, 9c, obtained by the previous machining of internal longitudinal grooves 10 (FIGURE 4). The mandrels, 5, 6 are connected by a jacket 11 arranged about the tubular member 9 and whose two ends are secured to the mandrels 5, 6 by pegs 12, 13 engaged in holes 14, 15 in the mandrels. Inside the tubular member 9 there is arranged a spindle 16 which is guided in two bearings 26, 27 mounted in two supports 17, 18, secured to the frame of the apparatus and which is fixed at one of its ends by a wedge 19 on a thrust plate 20 to which is imparted an alternating rectilinear movement by a machine tool or a jack (not shown in the drawing).

A shaft 21 is fixed to the thrust plate 20 by means of a pin 22 parallel to the spindle 16, which shaft is guided in bearings 23, 24, 25, mounted respectively in the supports 1, 2 and 18.

The spindle 16 and the shaft 21, secured to the plate 20, both have an alternating rectilinear movement of the same amplitude imparted thereto.

On the shaft 21 there is fixed a block 28 carrying a pawl or catch 29 engaged in a groove 30 with a helical ramp adapting itself in a part 31 secured to the jacket 11. The block 28 is engaged in a slot 32 of a longitudinal guiding member 33 fixed to the frame of the apparatus and preventing any rotational movement of the block 28 and the shaft 21.

Figure 3:
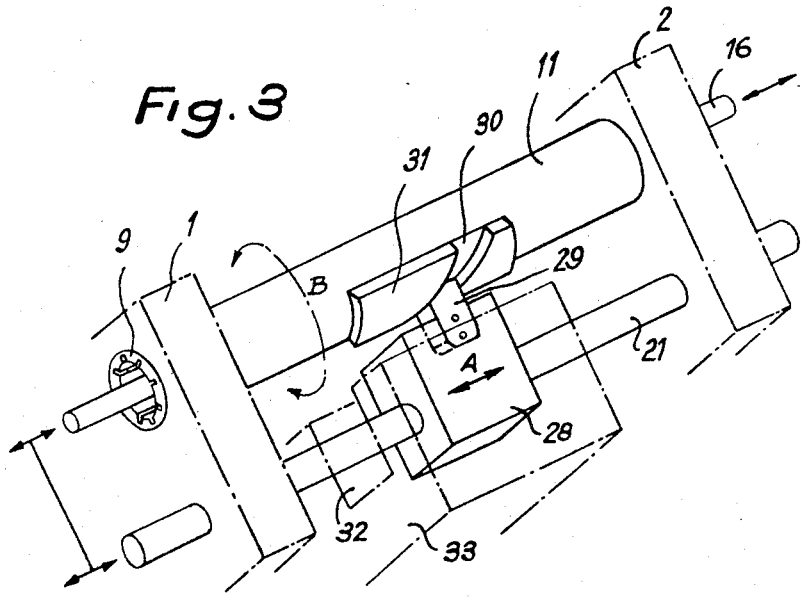
FIGURE 3 shows a perspective view of the apparatus of FIGURES 1 and 2.

The groove 30 is of such shape that its helical ramp corresponds to the helical shape of the fins and so that the alternating movement, in the direction of the arrow A of the catch 29 secured to the rod 21 is transformed, by the groove 30, into a circular movement, in the direction of the arrow B, which is communicated to the jacket 11 and consequently to the tubular member 9 (FIGURES 2 and 3).

The tool-supporting spindle 16 has a central slot 34 in which are arranged a tool carrier 35 and a blade 36. The tool carrier 35 has on its inside a groove 37 in which are fixed by means of screws 38, cutting tools 39 in the form of a blade, arranged one behind the other along parallel planes inclined with respect to an internal generating line of the tubular member which they cut. The tool carrier 35 is mounted to slide radially in the slot 34 and it is in abutment at its two ends in the spindle 16 whilst the blade 36 is mounted to slide axially in said slot and has at its two ends a part 40, 41 which is folded at an angle of 90°. At its folded end 40, the blade is subjected to the action of a spring 42 arranged in a housing 43 of the spindle and at its other folded end 41, it is in contact with one of the ends of a rod 44 sliding in a bore of the spindle 16.

The blade 36 is secured to the spindle 16 for axial sliding movement relative thereto by at least two pegs 45 screwed in said latter and whose ends 46 are engaged in at least two longitudinal guide slits 47 made in the blade 36.

The tool carrier 35 has, on its face in contact with the blade 36, at least two sloping ramps constituted by grooves 48, 48a in which are engaged catches 49 of the blade 36.

At its opposite end in contact with the blade 36, the rod 44 is supported against a cam 50 constituted by an offset disc and which is keyed to a shaft 51 mounted to rotate at its two ends in the spindle 16 and the shaft 21 with respect to which it is perpendicularly located.

On the shaft 51 there is keyed a ratchet wheel 52 whose teeth co-operate with a triggering catch 53 mounted to pivot on the support 18 and subjected to the action of a leaf spring 54, the catch 53 having a roller 55 on its side which causes said catch 53 to be lifted under the action of a ramp 56 fixed to the support plate 20.

The ratchet wheel 52 which rotates the cam 50 is located beneath the catch 53 which hooks on a tooth of the ratchet wheel and causes its rotation by a fraction of a turn as well as that of the cam 50, the position of the ratchet wheel being fixed by a counter catch or pawl 57 mounted to pivot on the plate 20 and preventing the ratchet wheel from slipping back after being unhooked from the catch 53.

The operation of the machining apparatus according to the invention is effected in the following manner:

The tubular member 9, inside which it is proposed to machine grooves 58 in order to define fins 59 between two adjacent grooves, is threaded into the mandrels 5 and 6 and it is fixed by clamping the rings 7, 8.

The end of the tool-carrying spindle 16 is engaged inside the tubular member 9 then the spindle bearing 17 which has been previously displaced in order to permit the tube to be placed in position, is fixed.

An alternating rectilinear movement is applied, by the thrust plate 20, to the tool-carrying spindle 16 which is displaced inside the tube first of all in the direction of the arrow C. During this advance path, the tools are not in contact with the wall of the tube and no machining takes place. Simultaneously, the shaft 21 is displaced, bringing with it the catch 29 engaged in the helical groove 30 which causes the rotation of the jacket 11 and the tubular member 9.

When the plate 20 approaches to the end of its travel, the ramp 56 lifts the roller 55 and the catch 53 is engaged in a tooth of the ratchet wheel 52. At the start of the return movement of the plate 20, the catch 53 rotates the ratchet wheel 52 through a certain angle also bringing with it the cam 50 which pushes to the left the rod 44 and consequently the blade 36. By its axial sliding against the action of the spring 42, the blade 36 radially moves the tool carrier 35 in abutment at its two ends, by its sloping grooves 48, 48a in which are arranged the catches 49 integral with the blade 36. The radial displacement of the tool carrier 35 corresponds to the depth of machining of the tools 39 during a machining action which is proportional to the pitch of the teeth of the ratchet wheel.

After a very short movement at the beginning of the return path sufficient to rotate the ratchet wheel 52 an increment, as described above, the ramp 56 lifts the roller 55 and causes the catch 53 to be released from the ratchet wheel 52 which is held in its position by the counter catch or pawl 57. The device with roller 55 and ramp 56 causes the catch to be engaged and released, in a circumferential space equal to the pitch of the teeth of the ratchet wheel.

During the return path in the direction opposite that of arrow C, the tools 39 which have been displaced radially by a distance corresponding to the depth of cut, penetrate into the internal wall of the tubular element 9. On the other hand, the combined movements on the spindle 16 which is displaced axially and the tubular member 9 which is rotated by the catch 29 co-operating with the helical groove 30, determining, on the internal wall of the tubular member, the preform of helical grooves 58.

Upon each alternate displacement of the spindle 16, there are reproduced the same operations as those described above, the depth of the grooves 58 being increased every time the tools 39 cut.

As soon as the grooves 58 determining the shape of the fins 59 have a predetermined depth for a portion such as 9a, the mandrels 5, 6 are unclamped and the tubular member 9 is made to rotate through a certain angle in order that a new portion such as 9b can be machined.

Thus, all the portions of the tubular member are successively machined and the helical fins obtained are all of the same pitch.

The pegs 12 and 13 can be used as dividers, the holes 14 and 15 in the mandrels 5, 6 having an angular gap equal to the portions 9a, 9b.

We claim:

1. Apparatus for machining grooves defining internal helical fins in tubular members, comprising: a frame; a pair of axially aligned bearings carried by said frame; a clamping mandrel mounted to rotate in each of said bearings for clamping the ends of a tubular member to be machined; a tubular jacket connected at its opposite ends to the mandrels for rotation therewith and surrounding the tubular member; a tool supporting spindle extending axially inside the tubular member; a shaft disposed outside the tubular member and extending parallel to said spindle, a thrust plate rigid with one end of the spindle and the shaft; bearing means carried by the frame and supporting the spindle, shaft and thrust plate for reciprocating movement; and means interconnecting the shaft and the tubular jacket for imparting a rotative movement to the tubular jacket upon reciprocation of the thrust plate.

2. Apparatus for machining grooves according to claim 1, wherein the means for rotating the jacket connecting the mandrels are constituted by a catch fixed to a unit secured to said shaft parallel to said tool supporting spindle, said catch being guided in a helical ramp carried by the external wall of said jacket.

3. Apparatus for machining grooves according to claim 1, wherein said tool-supporting spindle has a central slot in which are mounted to slide radially a tool carrier having a groove to receive cutting tools and, sliding axially, a blade subjected, at one of its ends to the action of a spring, and at its other end to an advance rod sliding axially in a bore of said spindle and actuated by a pawl and ratchet mechanism, said tool carrier having on one of its faces in contact with the blade at least two sloping ramps constituted by at least two grooves in which are engaged at least two catches secured to said blade which itself has at least two longitudinal guide slits in which are slideably engaged the ends of two pegs screwed to said spindle.

4. Apparatus for machining grooves according to claim 3, wherein said pawl and ratchet mechanism is constituted by a cam supported against one of the ends of said rod and fixed in rotation with a ratchet wheel keyed to a shaft mounted to rotate in said tool-carrying spindle and the shaft carrying the catch for controlling said jacket, said ratchet wheel being utilised in combination with a triggering catch fixed to one of said bearings of said spindle secured to said frame and carrying on its side a roller cooperating with a ramp juxtaposed to the ratchet wheel and secured to said thrust plate, said plate also carrying a counter catch engaged with the teeth of said ratchet wheel and preventing it from slipping back.

5. Apparatus for machining grooves according to claim 1, wherein said jacket is fixed to said mandrels by pegs which are selectively engaged in holes situated at distances which are angularly determined with respect to one another.

References Cited
UNITED STATES PATENTS

| | | | |
|---|---|---|---|
| 381,788 | 4/1888 | Hutchins | 90—10 |
| 1,310,933 | 7/1919 | Suverkrop et al. | 90—64 |
| 2,055,349 | 9/1936 | Harless | 90—96 X |
| 2,121,832 | 6/1938 | Simpson | 90—28.1 |
| 3,117,494 | 1/1964 | Acker et al. | 90—10 X |

ANDREW R. JUHASZ, Primary Examiner

G. WEIDENFELD, Assistant Examiner

U.S. Cl. X.R.

90—38, 96